United States Patent
Zwara et al.

(10) Patent No.: US 8,074,542 B2
(45) Date of Patent: Dec. 13, 2011

(54) CONFIGURABLE TOOLING BLOCK

(75) Inventors: Kenneth A. Zwara, East Aurora, NY (US); Jerome P. Zwara, Lancaster, NY (US); Shawn M. Szczygiel, Darien, NY (US)

(73) Assignee: KZ Precision Inc., Lancaster, NY (US)

( * ) Notice: Subject to any disclaimer, the term of this patent is extended or adjusted under 35 U.S.C. 154(b) by 226 days.

(21) Appl. No.: 12/477,357

(22) Filed: Jun. 3, 2009

(65) Prior Publication Data
US 2010/0307301 A1    Dec. 9, 2010

(51) Int. Cl.
*B23Q 11/00* (2006.01)
*B23Q 11/10* (2006.01)

(52) U.S. Cl. .................................. 82/50; 82/52

(58) Field of Classification Search .............. 82/50, 52, 82/901, 158, 152, 159; 29/39
See application file for complete search history.

(56) References Cited

U.S. PATENT DOCUMENTS

| | | | | |
|---|---|---|---|---|
| 2,645,952 A * | 7/1953 | Bunnell | ............ | 74/22 R |
| 2,940,473 A * | 6/1960 | Smith | ............ | 137/883 |
| 3,324,364 A * | 6/1967 | Caruthers | ............ | 318/604 |
| 3,703,112 A * | 11/1972 | Selby | ............ | 82/127 |
| 4,611,383 A | 9/1986 | Sonnek | | |
| 5,054,176 A | 10/1991 | Wachter | | |
| 5,265,505 A * | 11/1993 | Frechette | ............ | 82/159 |
| 6,134,998 A * | 10/2000 | Loeffler et al. | ............ | 82/162 |
| 7,762,166 B2 * | 7/2010 | Giannetti | ............ | 82/50 |

OTHER PUBLICATIONS

Foxwood Machine, Inc., "Load More Tools On Your CNC Lathe's Turret," Production Machining, Mar. 15, 2002 (3 pages). (http://www.productionmachining.com/articles/load-more-tools-on-your-cnc-lathe39s-turret.aspx?terms=%40pub_PM_type+%3d+Tech+Brief).
U S Shop Tools, "Gang Tools For CNC Lathes," Aug. 2007 Product Catalog, p. 118. (http://www.usshoptools.com/current_year/all_products/2007_08_pdf/PGS_118.pdf).
Engbar, Inc., Products, at least as early as Mar. 23, 2009 (7 pages). (http://engbarinc.com/products.asp).

* cited by examiner

*Primary Examiner* — Will Fridie, Jr.
(74) *Attorney, Agent, or Firm* — Hodgson Russ LLP

(57) ABSTRACT

A configurable tooling block for a CNC turret lathe holds a plurality of tools at a single index position of the turret. The tooling block includes a main body, a mounting flange, and a coolant manifold removably mounted on the main body on either a first side face or a second side face of the main body. The main body has a plurality of tool-receiving openings, at least one of which is a rectangular opening for receiving an OD tool. The manifold may be provided with individually operable valves for controlling coolant flow to output ports associated with the tool-receiving opening, and may be made of a material that is lighter than the material used to form the main body to reduce overall weight.

18 Claims, 7 Drawing Sheets

CONFIGURABLE TOOLING BLOCK

FIELD OF THE INVENTION

The present invention is relates generally to machine tools, and more particularly to tool holders for computer numerically controlled (CNC) turning machines.

BACKGROUND OF THE INVENTION

Numerically controlled turret lathes and turning centers generally comprise a motor-driven spindle having a chuck or faceplate for clamping or attaching a workpiece such that the workpiece rotates with the spindle. Opposite the spindle is a turret having a plurality of index positions angularly spaced about a pivot axis of the turret. Each index position may be allocated a different tool for engaging the workpiece. The turret is automatically indexable to bring a desired tool into a working position for engaging the workpiece, such that a programmed sequence of different machining operations may be performed on the workpiece without need for operator intervention.

The tools carried on the turret may include, for example, drill bits, reamers, boring tools, turning tools, facing tools, thread forming tools, and grooving tools. Some of these tools, such as a turning and boring tools, are typically mounted at the end of a rectangular bar, whereas others such as drill bits and reamers are formed at the end of a cylindrical shank. The rectangular bar or cylindrical shank, as the case may be, is gripped by a tool holder mounted on the turret or provided as an integral part of the turret. As used herein, the term "shank" in reference to a tool means both a rectangular bar and a cylindrical shank. One common type of tool holder is a VDI tool holder, which follows standards established by the Association of German Engineers in the early 1970s. These tool holders are characterized by a jagged toothed shaft adapted to be gripped by a VDI chucking mechanism.

A recognized drawback of tool change turrets is that a single tool is allocated to each index position of the turret, such that the turret must be indexed to select a different tool if called for by the programmed sequence of machining operations. Although indexing is carried out automatically in accordance with the machining program, it adds to the overall run time required to machine the workpiece into a finished part. While the additional time for indexing may be a small portion of the overall run time for a single part, the additional time accumulates and becomes quite significant in the context of a production job where a very large number of parts is produced.

Currently, applicants are aware of three commercial products intended to allow more than one tool to be allocated to a single turret index position, thereby making it possible to avoid turret indexing time for some tool changes. The first product is marketed under the trademark TURRETGANG, and includes a rectangular bar shank for mounting at an OD tool index position of a turret. A tool block portion is provided at a distal end of the rectangular bar shank and includes three cylindrical tool-receiving openings spaced along an X-axis of the CNC machine for holding three inner diameter ("ID") tools. The tool block portion also includes coolant passages.

The second product is marketed under the trademark TRIPLIT, and includes a cylindrical shank for mounting in a round drill index position of a turret. The TRIPLET includes a tool block portion coaxially arranged at a distal end of the shank. The tool block portion has three cylindrical tool-receiving openings spaced along an X-axis of the CNC machine for holding three ID tools. The tool block portion also includes coolant passages.

The third product known to applicant is a line of multi-tool blocks offered by Engbar Inc. of Las Vegas, Nev. having multiple cylindrical tool-receiving openings for holding a plurality of ID tools.

One drawback of the existing tooling block products is that they are relatively heavy, which can lead to inaccuracies in positioning a given tool relative to the lather spindle when the turret is indexed. To reduce inaccuracies to acceptable tolerance levels, the number of tools carried by the tooling block must be limited.

Another drawback of the existing tooling block products is that both ID and OD tools cannot be allocated to the same index position on a turret.

SUMMARY OF THE INVENTION

The configurable tooling block of the present invention addresses these and other problems associated with the prior art.

A configurable tooling block formed in accordance with an embodiment of the present invention generally comprises a main body, a mounting flange extending from the main body, and a coolant manifold removably mounted on the main body.

The main body includes a front face, a rear face, a top face, a bottom face, a first side face, and a second side face. The main body has a plurality of tool-receiving openings through its front face each for receiving a shank of a respective tool. the main body also has a first plurality of threaded holes through the first side face communicating with the plurality of tool-receiving openings, and a second plurality of threaded holes through the second side face communicating with the plurality of tool-receiving openings. The threaded holes allow the tool shanks to be clamped in the tool receiving openings from either side of the main body using suitable threaded fasteners, such as socket screws, and the unused holes help reduce the overall weight of the tooling block.

The mounting flange extends from the rear face of the main body, and provides structure that can be clamped in a standard VDI tool holder or directly in a turret.

The coolant manifold is removably mounted on the main body adjacent either the first side face or the second side face. The coolant manifold includes an inlet port connected to a plurality of outlet ports by a flow duct. Each outlet port is associated with a different tool-receiving opening. The coolant manifold may include a plurality of valves individually operable to selectively open and close flow to each of the outlet ports. A plurality of coolant nozzle attachments may be connected to the outlet ports to direct coolant flow onto the tool/workpiece interface. While the main body is made from steel for strength, the coolant manifold may be made from a lighter material, such as aluminum or plastic, to reduce overall weight.

DETAILED DESCRIPTION OF THE INVENTION

Figure 1:
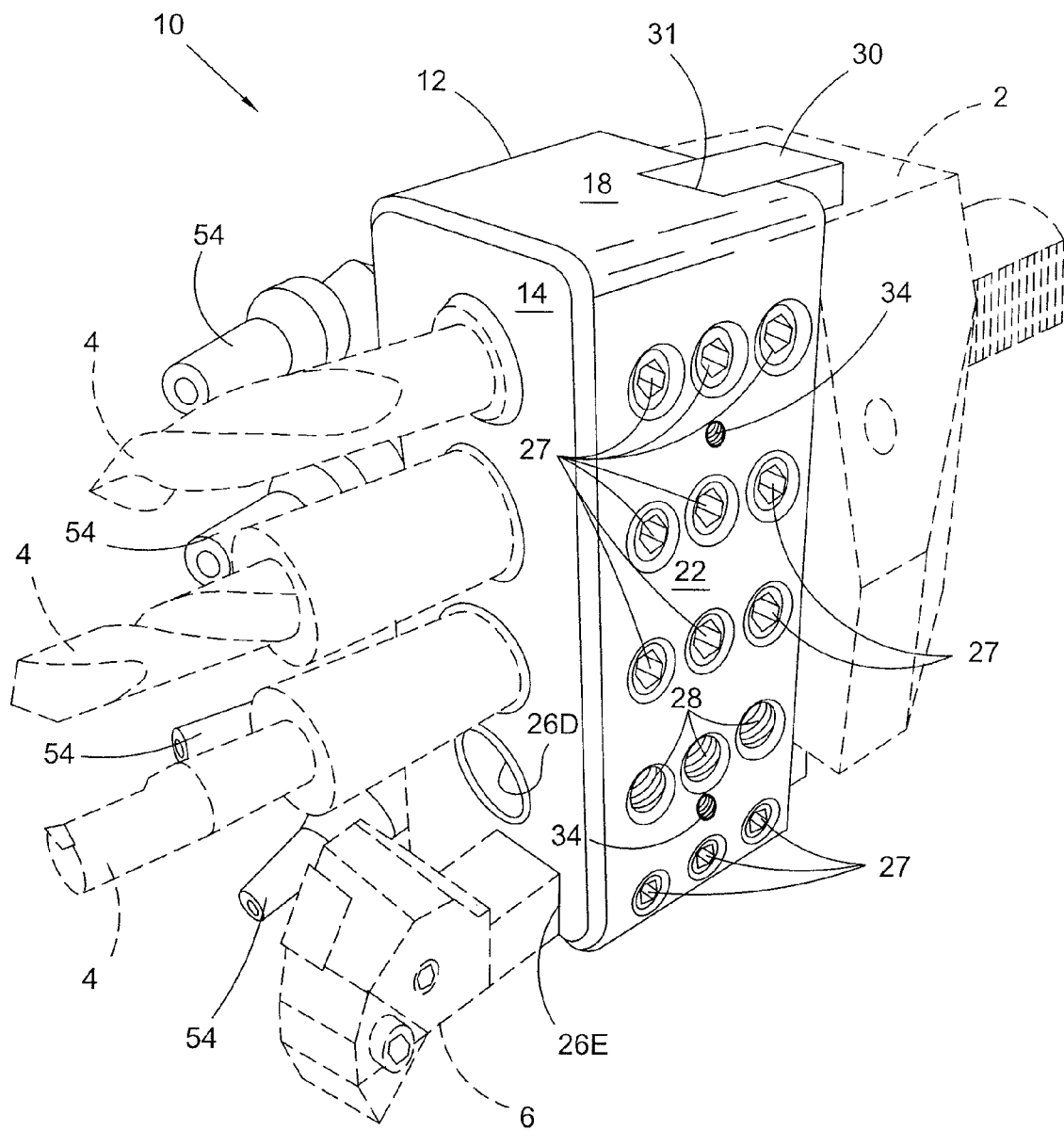
FIG. 1 a perspective view of a tooling block formed in accordance with an embodiment of the present invention, shown mounted in a VDI tool holder and carrying a plurality of tools, the VDI tool holder being shown in dotted line to distinguish them from the tooling block.
Figure 2:
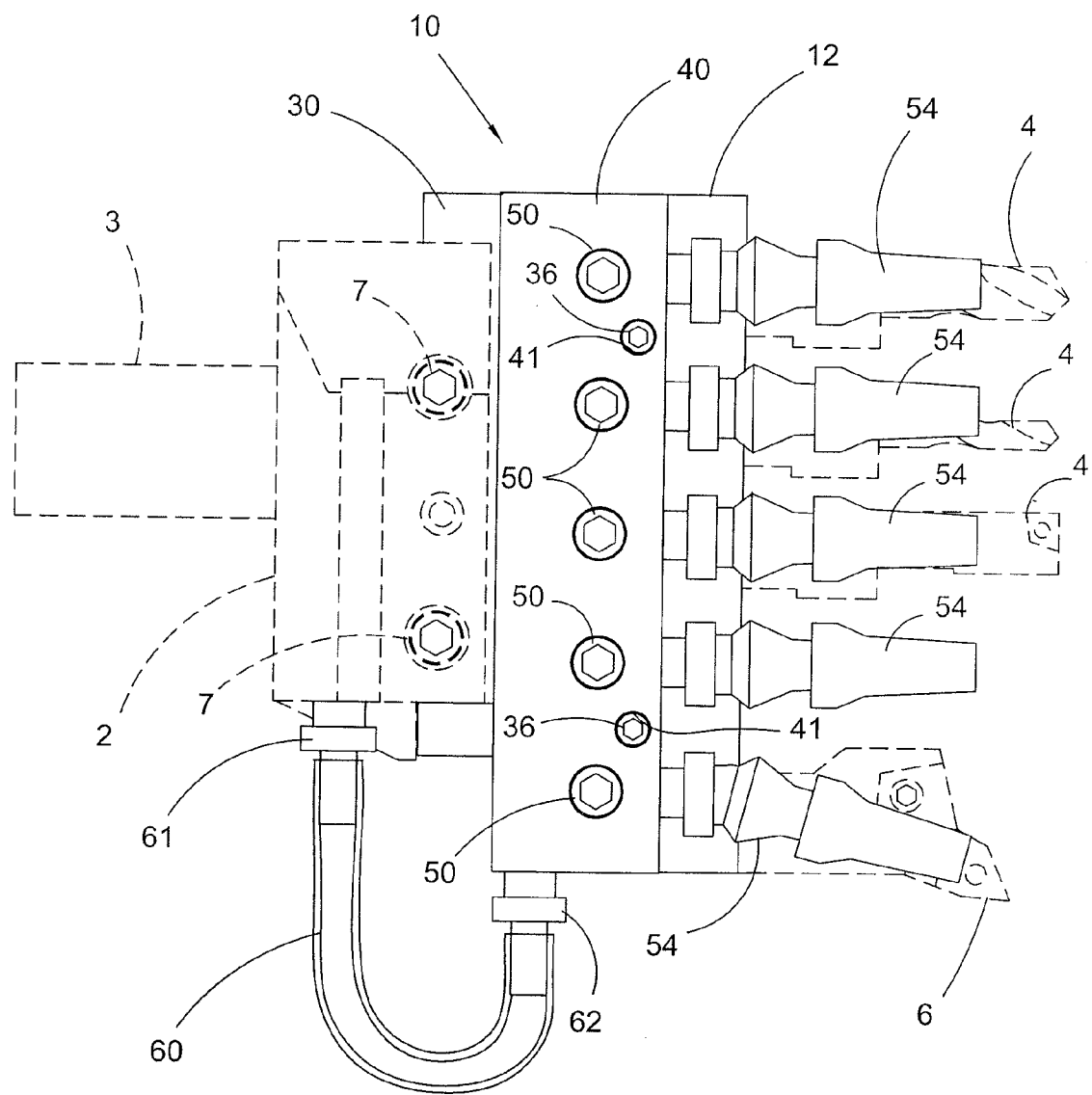
FIG. 2 is an opposite side elevational view of the tooling block, VDI tool holder, and tools shown in FIG. 1.

FIGS. 1 and 2 show a tooling block 10 formed in accordance with an embodiment of the present invention. Tooling block 10 is shown mounted in a VDI tool holder 2 characterized by a toothed VDI shaft 3. Tooling block 10 is useful to releasably hold a plurality of tools 4, 6 as further described herein. Tooling block 10 generally comprises a main body 12, a mounting flange 30, and a coolant manifold 40.

Figure 3:
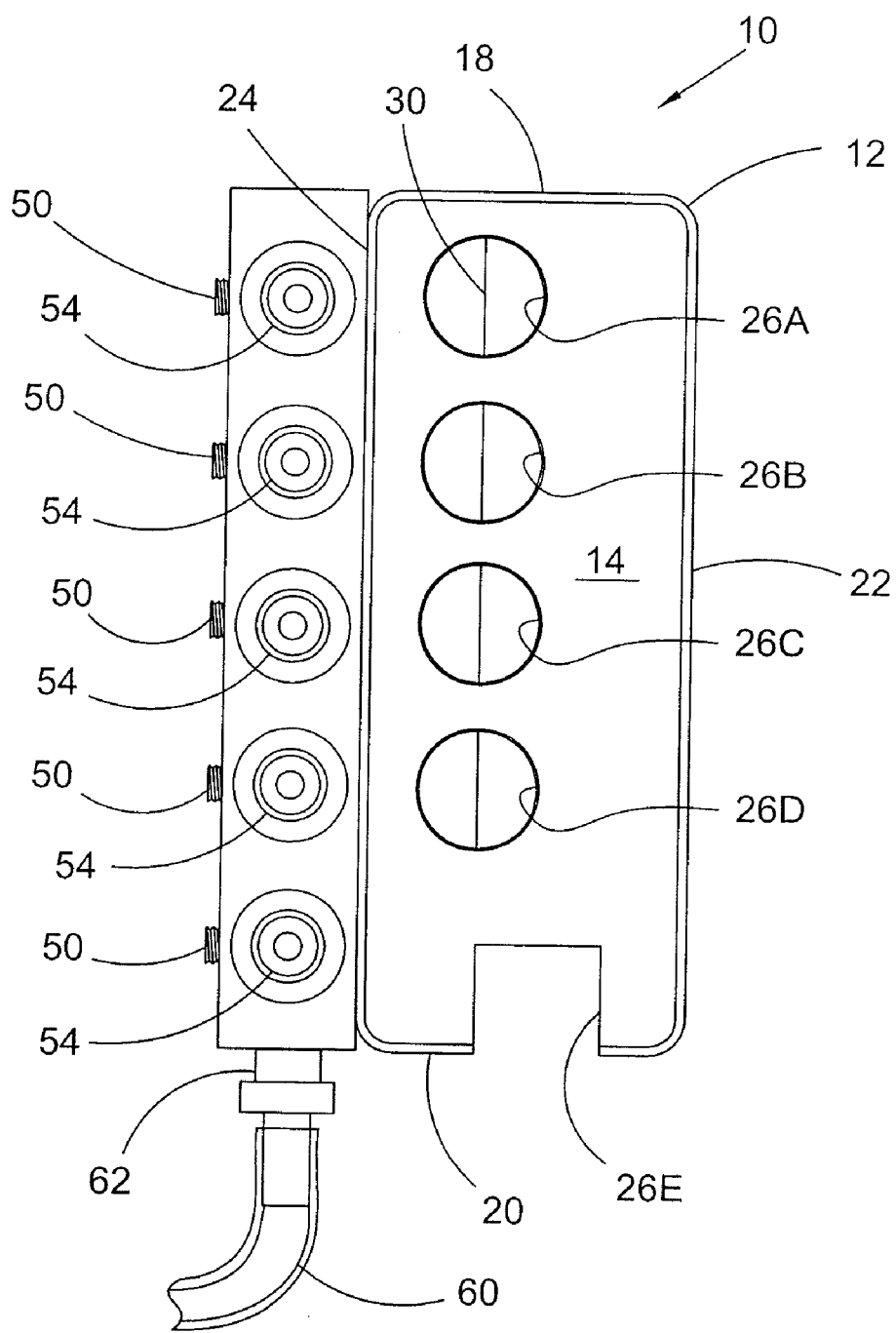
FIG. 3 is a front elevational view of the tooling block.
Figure 4:
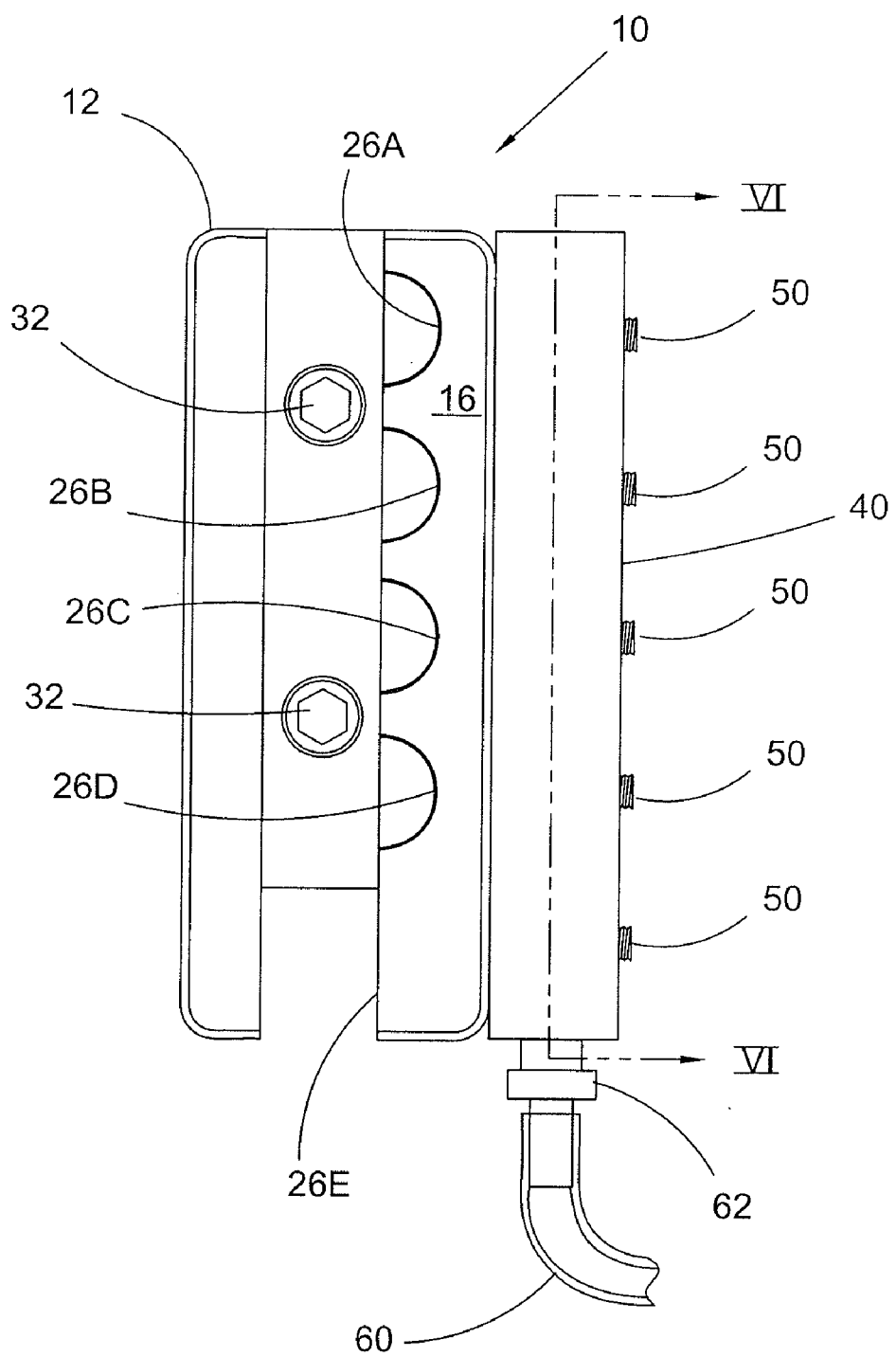
FIG. 4 is a rear elevational view of the tooling block.
Figure 5:
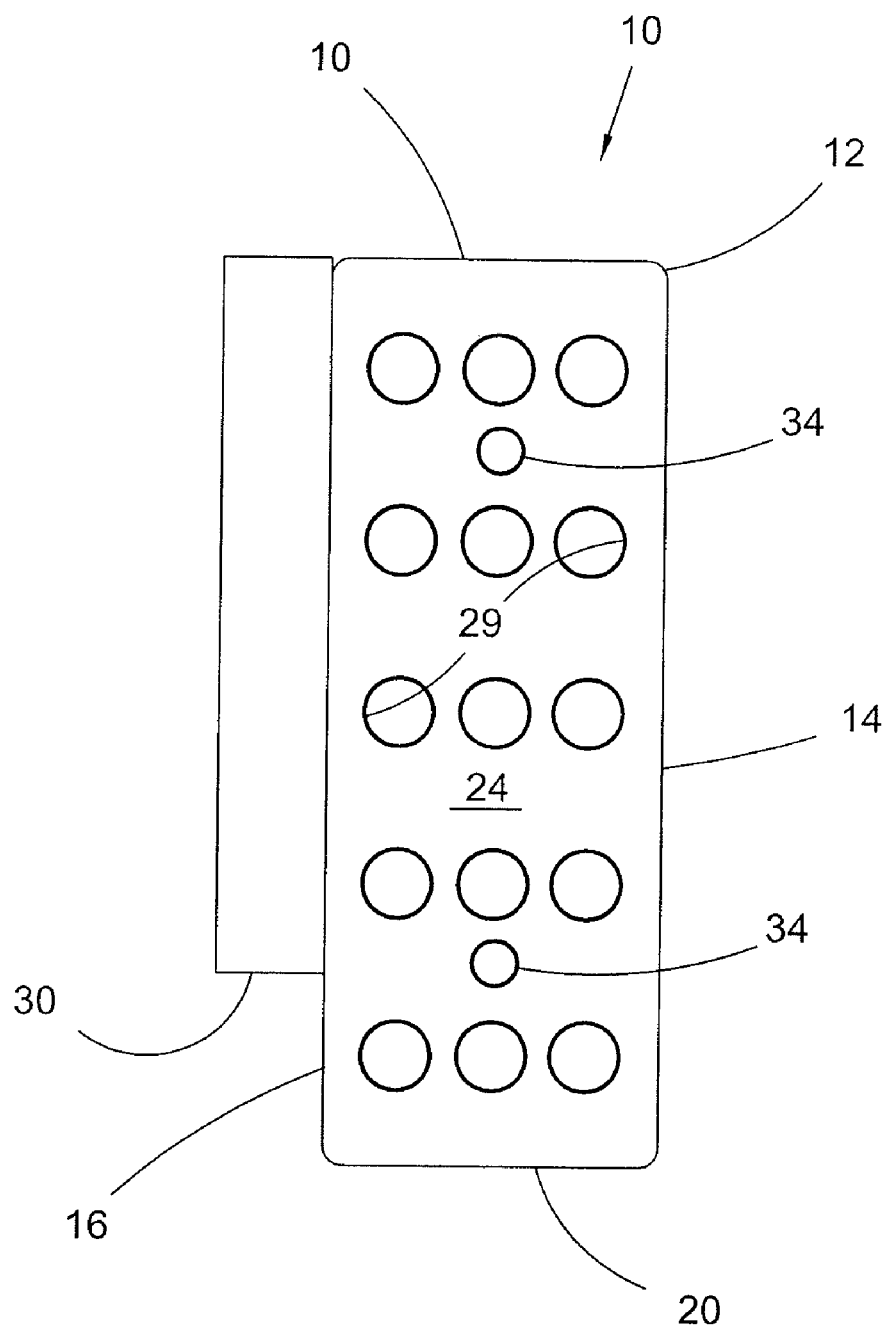
FIG. 5 is a side elevational view of a main body and a mounting flange of the tooling block.

Reference is also made now to FIGS. 3-5. Main body 12 may be in the shape of rectangular block including a front face 14, a rear face 16, a top face 18, a bottom face 20, a first side face 22, and a second side face 24. Main body 12 has a plurality of tool-receiving openings 26A-26E through front face 14. Each opening may receive a shank of a respective tool 4 or 6. The size, shape, number, and arrangement of tool-receiving openings is subject to design choice, with a primary consideration being standard tool shank sizes. As best seen in FIGS. 1 and 3, tool-receiving openings 26A-26D in the present embodiment are circular in shape for receiving cylindrical tool shanks, whereas opening 26E is rectangular in shape for receiving a rectangular bar tool shank. An outer diameter ("OD") turning tool 6 typically has a rectangular bar shank, while an inner diameter ("ID") tool 4 typically has a cylindrical shank. Thus, in the embodiment shown, openings 26A-26D are intended to hold ID tools, while opening 26E is intended to hold an OD tool. It is advantageous to provide at least one rectangular opening and at least one circular opening in main body 12 so that both an OD turning operation and an ID turning operation may be performed on the same workpiece without the need to index the CNC machine's turret.

Main body 12 further includes a first plurality of threaded holes 28 through first side face 22 communicating with tool-receiving openings 26A-26E. In the embodiment shown, each tool-receiving opening has a row of three threaded holes 28. Tools 4, 6 may be releasably secured within respective tool-receiving openings 26A-26E by a series of set screws 27 mated in holes 28 and tightened against the tool shank at spaced locations along the tool shank. FIG. 1 depicts set screws 27 as socket-head set screws, however other threaded fasteners may be substituted without straying from the invention.

Mounting flange 30 extends from rear face 16 of main body 12. Mounting flange 30 may have a rectangular cross-section. As mentioned above, mounting flange 30 may be clamped in a VDI tool holder or used to mount tooling block 10 directly on a CNC machine turret. For sturdy construction, a rectangular slot 31 may be machined in rear face 16 of main body 12 to the receive a front portion of flange 30, which may be fastened to the main body by socket-head cap screws 32 as shown in FIG. 4. Flange 30 may be fixed to main body 12 by other means, for example welding. Alternatively, flange 30 may be formed integrally with main body 12. Referring again to FIG. 4, flange 30 may extend from a location flush with top face 18 to a location short of bottom face 20 to allow tool-receiving opening 26E to open through rear face 16 to allow a rectangular bar shank to extend beyond rear face 16 if necessary. Also, it is advantageous that flange 30 cover only a portion of tool receiving openings 26A-26D because it serves to limit insertion of the tool shank and allow air to escape through the uncovered portions of tool-receiving openings 26A-26D for easier insertion of the tool shanks.

By way of non-limiting example, main body 12 and mounting flange 30 may be machined from AISI 4140 steel or CR1018 cold rolled steel.

Figure 6:
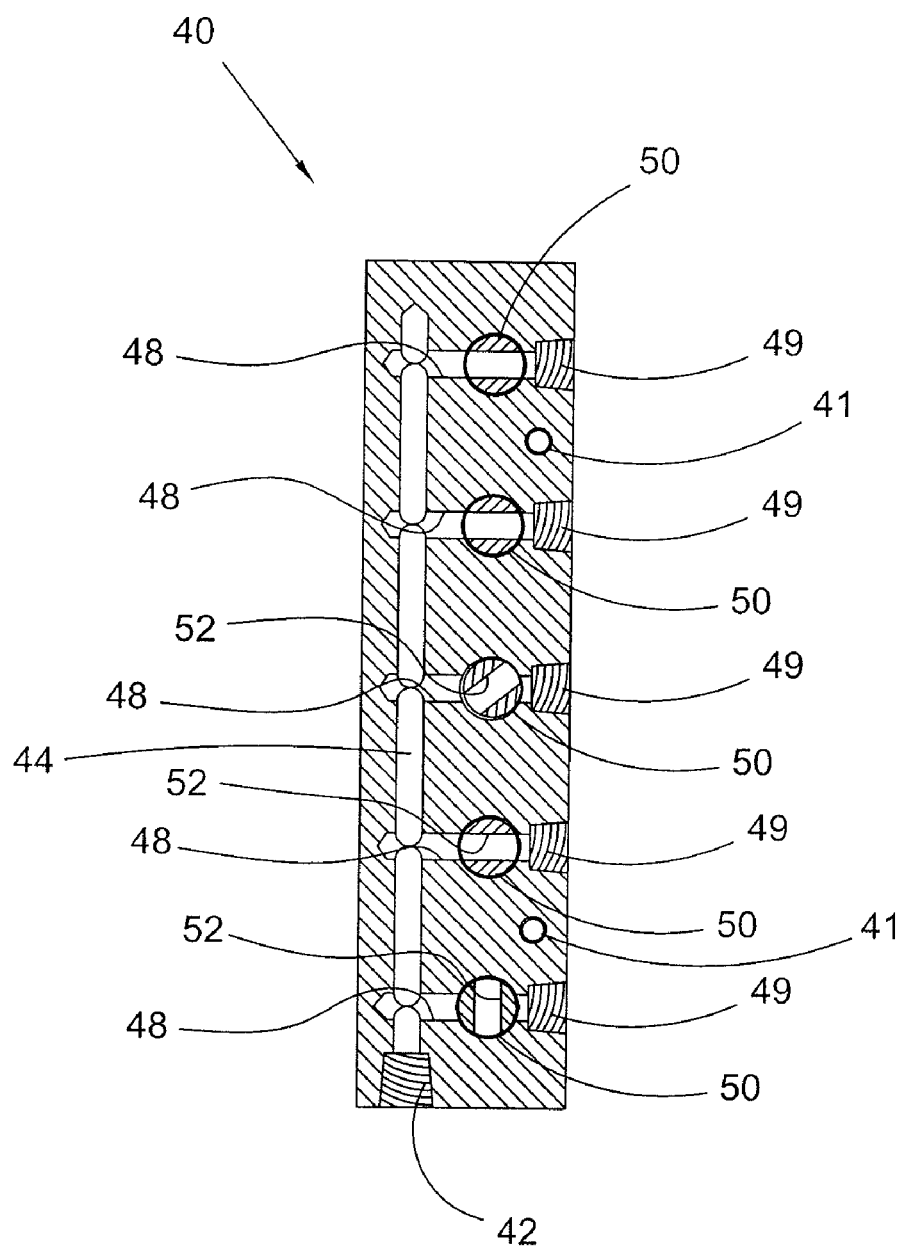
FIG. 6 is a sectional view of a coolant manifold of the tooling block taken generally along the line VI-VI in FIG. 4.

Coolant manifold 40, shown in a sectional view in FIG. 6, may be removably mounted on main body 12 adjacent second side face 24 by manifold attachment screws 36 extending through holes 41 in manifold 40 and into corresponding threaded manifold attachment holes 34 in second side face 24. Coolant manifold 40 includes an inlet port 42, a plurality of outlet ports 49 associated one with each of the plurality of tool-receiving openings 26A-26E, and a flow duct 44 in flow communication with inlet port 42 and each of the plurality of outlet ports 49. In the embodiment shown, flow duct 44 includes outlet braches 48 for communication with outlet ports 49. Flow of coolant to each individual outlet port 49 may be controlled by a plurality of rotational flow valves 50 respectively arranged in outlet branches 48.

Coolant manifold 40 may be connected to a source of liquid coolant by a coolant hose 60. In the illustrated embodiment, an entry end of coolant hose 60 is connected by way of a coupling 61 to a coolant outlet port of VDI tool holder 2. In configurations where VDI tool holder 2 is absent, the entry end of coolant hose 60 may be coupled to a coolant outlet port associated with a turret on which tooling block 10 is mounted, or with an alternative source of coolant. An exit end of coolant hose 60 may be connected to inlet port 42 of manifold 40 by a coupling 62.

The provision of manifold 40 as a removable module on main body 12, rather than as a manifold integrally formed with the main body, helps provide two important advantages. First, it allows manifold 40 to be made of a material that is much lighter (has a lower density) than steel used to make main body 12 and flange 30. Because overall weight of tooling block 10 and the tools 4, 6 will effect the speed and accuracy of indexing, it is advantageous to reduce the weight of tooling block 10 where possible. Consequently, coolant manifold 40 may be made, for example, from plastic such as DELRIN® or NYLON®, or from a lighter (less dense) metal such as aluminum.

A second advantage of removable manifold 40 is that it may be selectively mounted on either first side face 22 or on second side face 24, depending upon whether a left-hand or right-hand tooling configuration is desired. The figures show manifold 40 mounted against second side face 24 by manifold attachment screws 36 extending through holes 41 and into threaded manifold attachment holes 34 in second side face 24. As may be seen in FIG. 1, first side face 22 also includes a pair of threaded manifold attachment holes 34, whereby manifold 40 may be fastened against first side face 22 instead of second side face 24.

When manifold 40 is mounted on main body 12 adjacent first side face 22, it is necessary to secure tools 4, 6 through side face 24. For this reason, main body 12 additionally includes a second plurality of threaded holes 29 through second side face 24 communicating with tool-receiving openings 26A-26E. Thus, as best seen in FIG. 5, each tool-receiving opening has another row of three threaded holes 29 entering from second side face 24 opposite threaded holes 28 entering from first side face 24. Holes 28 and 29 may be in alignment with one another to simplify manufacturing of main body 12 by enabling a given hole 28 and its counterpart hole 29 to be drilled in a single operation. Tools 4, 6 may be releasably secured within respective tool-receiving openings 26A-26E by set screws 27 mated in holes 29 and tightened against the tool shank at spaced locations along the tool shank.

The provision of holes 29 through second side face 24 results in an originally unintended benefit, which is to further reduce the overall weight of tooling block 10 by removing material for main body 12.

With the weight reduction aspects mentioned above, the present invention has realized significant increase in the number of tools that can be allocated through the tooling block to a single index position of a turret. Specifically, under current embodiments of the present invention, up to five tools may be held at a single turret index position. Therefore, in the case of a twelve-position turret, tool capacity may be increased from twelve tools up to sixty tools.

It is preferred that coolant hose 60 be flexible so that it can be connected to provide flow communication to coolant manifold 40 regardless of which side face 22 or 24 the manifold is mounted against.

Figure 7:
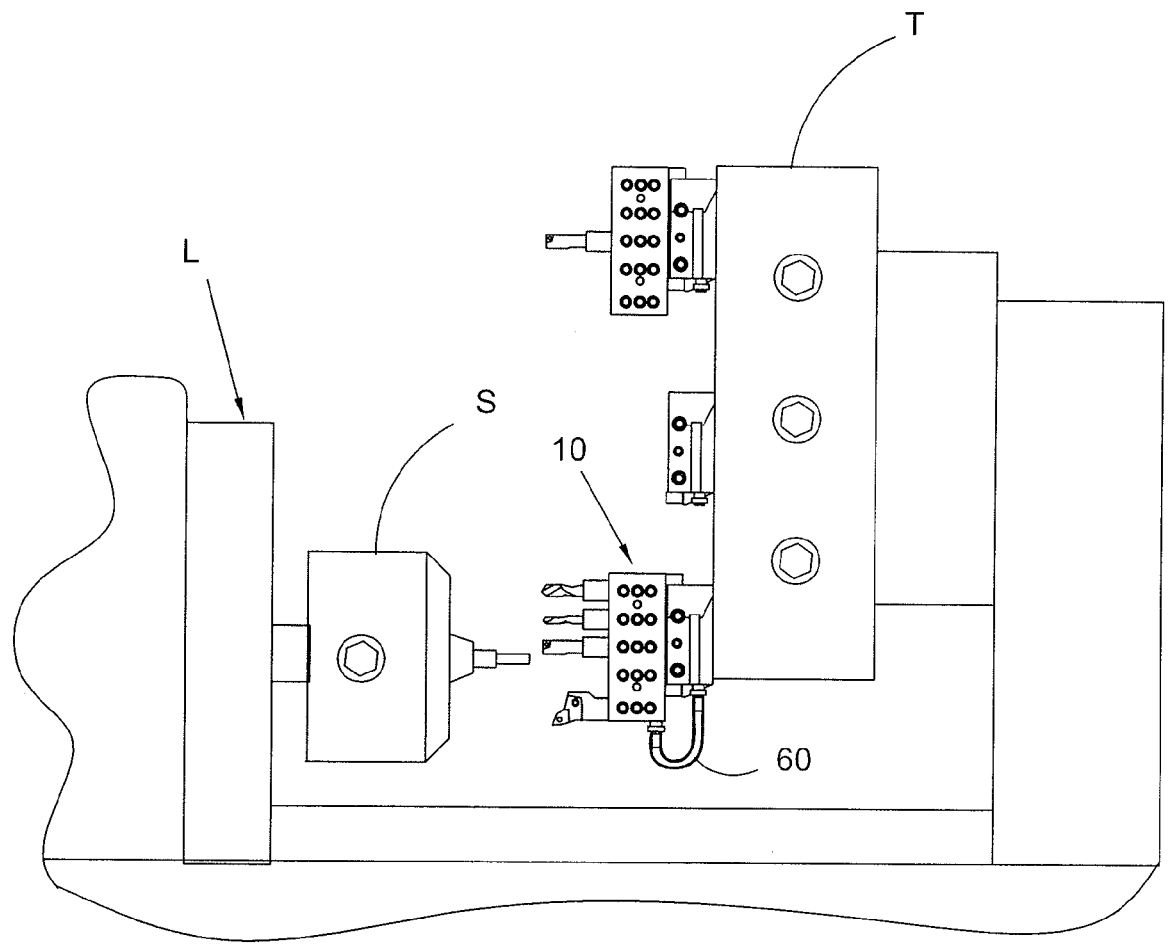
FIG. 7 is a side view showing the tooling block of the present invention mounted on a turret of a CNC lathe.

FIG. 7 shows use of tooling block 10 in a CNC lathe L having a spindle S on which a workpiece (not shown) may be chucked for rotation with the spindle, and an indexable turret T that pivots about an axis extending parallel to a rotational axis of the spindle S. The flange of tooling block 10 is clamped by VDI tool holder 2, which in turn is mounted on turret T of CNC lathe L. To initially use a tool carried by tooling block 10, turret T is indexed (pivoted) to position tooling block 10 opposite spindle S, and the X-axis (cross slide) position is adjusted to bring a chosen tool in tooling block to a reference position with respect to the spindle axis and workpiece. The machining operations programmed for the chosen tool, which may involve X, Y, and Z axis movements of the tool relative to the spinning workpiece, may then be executed, after which the tool may be returned to the reference position. Because the other tools held by tooling block 10 are at known positions relative to the initially chosen tool, it is a simple matter to move the next tool into the reference position without the need to index turret T. The program may change to the next tool without indexing the turret T by executing an X-axis or Y-axis movement (depending upon the orientation of tooling block 10) corresponding to the distance between the two tools in the tooling block. Such a tool change movement is much faster and introduces less vibration than an a turret indexing step in which turret T is pivoted.

As will be appreciated, OD turning and ID machining operations may be performed from a single turret index position.

Only a single coolant hose connection is needed to the tooling block, and coolant flow to each tool can be controlled by adjusting each valve 50. If a tool-receiving opening is not used, its associated coolant flow may be easily shut off by rotating the valve.

The invention is not to be limited to the specific embodiments disclosed, and modifications and other embodiments are intended to be included within the scope of the appended claims.

PARTS LIST

2 VDI tool holder
3 Shaft of VDI tool holder
4 Inner diameter (ID) tool
6 Outer diameter (OD) tool
7 Clamping bolt of VDI tool holder
L Lather
S Spindle
T Turret
10 Configurable tooling block
12 Main body of tooling block
14 Front face of main body
16 Rear face of main body
18 Top face of main body
20 Bottom face of main body
22 First side face of main body
24 Second side face of main body
26A-E Tool-receiving openings
27 Socket set screws
28 Threaded holes through first side face
29 Threaded holes through second side face
30 Mounting flange
31 Slot in main body
32 Socket screws securing flange to main body
34 Threaded manifold attachment holes in side faces of main body
36 Manifold attachment screws
40 Coolant manifold
41 Through-holes in manifold for attachment screws
42 Inlet port of manifold
44 Flow duct of manifold
48 Outlet branches of flow duct
49 Outlet ports of manifold
50 Rotational flow valves
52 Flow valve passage
54 Directional nozzles
60 Coolant hose
61 Coolant hose coupling to outlet port of VDI tool holder/turret
62 Coolant hose coupling to inlet port of manifold

What is claimed is:

1. A tooling block comprising:
a main body including a front face, a rear face, a top face, a bottom face, a first side face, and a second side face, the main body having a plurality of tool-receiving openings through the front face each for receiving a shank of a respective tool, and the main body further having a first plurality of threaded holes through the first side face communicating with the plurality of tool-receiving openings;
a mounting flange extending from the rear face of the main body; and
a coolant manifold mounted on the main body adjacent the second side face, the coolant manifold including an inlet port, a plurality of outlet ports associated one with each of the plurality of tool-receiving openings, and a flow duct in flow communication with the inlet port and each of the plurality of outlet ports;
wherein the plurality of tool-receiving openings includes a rectangular opening for receiving a rectangular bar tool shank;
wherein the rectangular opening is formed adjacent the bottom face of the main body and opens through the bottom and rear faces of the main body.

2. The tooling block according to claim 1, wherein the plurality of tool-receiving openings includes at least one circular opening for receiving a cylindrical tool shank.

3. The tooling block according to claim 1, wherein the plurality of tool-receiving openings includes four circular openings each for receiving a respective cylindrical tool shank, and one rectangular opening for receiving a rectangular bar tool shank.

4. The tooling block according to claim 1, wherein the first plurality of threaded holes includes a series of threaded holes spaced along each of the plurality of tool-receiving openings.

5. The tooling block according to claim 1, wherein the mounting flange has a rectangular cross-section.

6. The tooling block according to claim 1, wherein the main body is formed of a first material and the coolant manifold is formed of a second material different from the first material, wherein the density of the second material is less than the density of the first material.

7. The tooling block according to claim 1, wherein the coolant manifold further includes a plurality of valves individually operable to selectively open and close flow to each of the plurality of outlet ports.

8. The tooling block according to claim 1, further comprising a plurality of coolant nozzle attachments each connected to a respective one of the plurality of outlet ports.

9. The tooling block according to claim 1, further comprising a coolant hose connected to the inlet port of the coolant manifold for connecting the coolant manifold to a coolant source.

10. A tooling block comprising:
a main body including a front face, a rear face, a top face, a bottom face, a first side face, and a second side face, the main body having a plurality of tool-receiving openings through the front face each for receiving a shank of a respective tool, and the main body further having a first plurality of threaded holes through the first side face communicating with the plurality of tool-receiving openings and a second plurality of threaded holes through the second side face communicating with the plurality of tool-receiving openings;
a mounting flange extending from the rear face of the main body; and
a coolant manifold removably mounted on the main body adjacent either of the first and second side faces, the coolant manifold including an inlet port, a plurality of outlet ports associated one with each of the plurality of tool-receiving openings, and a flow duct in flow communication with the inlet port and each of the plurality of outlet ports.

11. The tooling block according to claim 10, wherein the plurality of tool-receiving openings includes at least one circular opening for receiving a cylindrical tool shank and a rectangular opening for receiving a rectangular bar tool shank.

12. The tooling block according to claim 11, wherein the rectangular opening is formed adjacent the bottom face of the main body and opens through the bottom and rear faces of the main body.

13. The tooling block according to claim 10, wherein the first plurality of threaded holes and the second plurality of threaded holes each include a series of threaded holes spaced along each of the plurality of tool-receiving openings.

14. The tooling block according to claim 13, wherein each of the first plurality of threaded holes is aligned with a respective on of the second plurality of holes.

15. The tooling block according to claim 10, wherein the main body is formed of a first material and the coolant manifold is formed of a second material different from the first material, wherein the density of the second material is less than the density of the first material.

16. The tooling block according to claim 10, wherein the coolant manifold further includes a plurality of valves individually operable to selectively open and close flow to each of the plurality of outlet ports.

17. The tooling block according to claim 10, further comprising a plurality of coolant nozzle attachments each connected to a respective one of the plurality of outlet ports.

18. The tooling block according to claim 10, further comprising a flexible coolant hose connected to the inlet port of the coolant manifold for connecting the coolant manifold to a coolant source.

* * * * *